(12) United States Patent
Umeda

(10) Patent No.: US 7,120,464 B2
(45) Date of Patent: Oct. 10, 2006

(54) CALL CONNECTION MANAGEMENT EQUIPMENT FOR WIRELESS MOBILE COMMUNICATION NETWORK

(75) Inventor: Masanori Umeda, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 693 days.

(21) Appl. No.: 09/883,986

(22) Filed: Jun. 20, 2001

(65) Prior Publication Data

US 2001/0055982 A1   Dec. 27, 2001

(30) Foreign Application Priority Data

Jun. 26, 2000   (JP) .............................. 2000-190942

(51) Int. Cl.
   *H04Q 7/20* (2006.01)
   *H04M 1/00* (2006.01)
   *H04M 1/56* (2006.01)
(52) U.S. Cl. ................. 455/560; 455/561; 379/142.01; 379/142.02
(58) Field of Classification Search ................. 455/560, 455/561; 379/142.01, 142.02
   See application file for complete search history.

(56) References Cited

U.S. PATENT DOCUMENTS 6,539,232 B1 *   3/2003   Hendrey et al. .......... 455/456.1
6,611,501 B1 *   8/2003   Owen et al. ................. 370/254
6,621,894 B1 *   9/2003   Fujino et al. .......... 379/142.06

OTHER PUBLICATIONS

"ISDN Etoki Dokuhon" Ikeda et al., Ohmu-sha, 1998, pp. 44-53.

* cited by examiner

*Primary Examiner*—Rasha S. Al-Aubaidi
(74) *Attorney, Agent, or Firm*—Venable; James R. Burdett

(57) ABSTRACT

A call connection management equipment for decreasing the required time from a call connection request to a call connection establishment in a wireless mobile communication network. This call connection management equipment registers generated call connection information to a connection registration part, and stores call connection history, such as connection count. The call connection management equipment uses the already registered connection information when the call connection history satisfies a predetermined condition, and generates a new connection information when the call connection history does not satisfy the predetermined condition. When the predetermined condition is not satisfied, the connection information is deleted. The connection information is also deleted when a wireless base station to accommodate a calling terminal is switched, or when an interface to accommodate a called terminal is switched.

14 Claims, 12 Drawing Sheets

FIG.4

| Calling Terminal ID | Called Terminal ID | VPI | VCI |
|---|---|---|---|
| 090-1643-**** | 03-3861-**** | 3 | 1 |
| 090-3274-**** | 090-1998-**** | 5 | 1 |
| ⋮ | ⋮ | ⋮ | ⋮ |

FIG.7

| Calling Terminal ID | Called Terminal ID | Count History (times) |
|---|---|---|
| 090-1643-**** | 03-3861-**** | 3 |
| 090-3274-**** | 03-1998-**** | 8 |
| 090-3628-**** | 06-6321-**** | 1 |
| 090-7349-**** | 090-3191-**** | 1 |
| | | |

FIG.8

| Threshold Value of Count | 3 |
|---|---|

FIG. 10

| Calling Terminal ID | Called Terminal ID | Cumulative Time History (minutes) |
|---|---|---|
| 090-1643-**** | 03-3861-**** | 93 |
| 090-3274-**** | 03-1998-**** | 220 |
| 090-3628-**** | 06-6321-**** | 3 |
| 090-7349-**** | 090-3191-**** | 25 |
| | | |

FIG. 11

| Threshold Value of Cumulative Time | 60 |
|---|---|

FIG. 13

| Calling Terminal ID | Called Terminal ID | Service Type History |
|---|---|---|
| 090-1643-**** | 03-3861-**** | 64K Non-Restrictive Bearer |
| 090-3274-**** | 03-3998-**** | 384K Non-Restrictive Bearer |
| 090-3628-**** | 06-6321-**** | 64K Voice |
| 090-7349-**** | 090-3191-**** | 64K Voice |
| ... | ... | ... |

FIG. 14

| Service Type | Non-Restrictive Bearer |
|---|---|

FIG. 16

| Calling Terminal ID | Called Terminal ID | Distance Between Terminals (km) |
|---|---|---|
| 090-1643-**** | 03-3861-**** | 300 |
| 090-3274-**** | 03-3998-**** | 200 |
| 090-3628-**** | 06-6321-**** | 5 |
| 090-7349-**** | 090-3191-**** | 10 |
| | | |

FIG. 17

| Threshold Value of Distance | 100 |
|---|---|

CALL CONNECTION MANAGEMENT EQUIPMENT FOR WIRELESS MOBILE COMMUNICATION NETWORK

BACKGROUND OF THE INVENTION

1. Field of the Invention

The present invention relates to a call connection management equipment. The call connection management equipment of the present invention is applied to a wireless mobile communication network where an ATM (Asynchronous Transfer Mode) system is used for wire communication, for example.

2. Description of Related Art

In a wireless mobile communication network, wireless communication is executed between a base station and a mobile terminal, and wire communication is executed between base stations or between a base station and another network. Therefore the wireless mobile communication network comprises a wireless mobile communication system and a wire communication system.

A known wireless mobile communication system is, for example, PDC (Personal Digital Cellular) and GSM (Global System for Mobile Communications). In these wireless mobile communication systems, a service providing area is divided into many zones, and a wireless base station is disposed for each zone. Each wireless base station accommodates mobile terminals which are positioned in a zone covered by the base station. Therefore regardless which zone where mobile terminals are positioned, communication with a network is always established. In a wireless mobile communication system, a base station which accommodates a terminal is switched along with the movement of the terminal. Therefore when the terminal transmits a call connection request, the base station which receives the request is not always the same. In addition, when the terminal receives a call, the base station which calls is not always the same. Therefore the wireless mobile communication system uses a unique technology which does not exist in the wire communication system.

As a wire communication system, an ATM communication system, for example, is used. In ATM communication, VPI (Virtual Path Identifier) and VCI (Virtual Channel Identifier) are used. VPI and VCI are defined based on the OSI (Open System Inter-connection) reference model, for example. VPI and VCI are generated when a call communication is requested. VPI and VCI are identifiers for the destination, and are used for routing. In other words, connection between a calling terminal and a called terminal is established using VPI and VCI.

Routing using VPI and VCI is executed each time a call connection is requested. Some processing time is required from the request of call connection to the establishment of connection. In addition, if call connection requests from many mobile terminals concentrate, load on the network increases and processing time increases. The shorter the processing time for establishing connection the better.

SUMMARY OF THE INVENTION

It is an object of the present invention to decrease the time required from the request of call connection to the establishment of call connection in a wireless mobile communication network.

A call connection management equipment for a wireless mobile connection network according to the present invention comprises connection setting means for generating call connection information to perform call connection between an interface on a wire communication system and another interface; communication registration means for storing call connection information; history storage means for storing call connection history; judgment means for comparing the call connection history with a predetermined condition and connection establishment means for establishing call connection between an interface and another interface based on the call connection information stored in the connection registration means when the call connection history satisfies the predetermined condition, and establishing call connection between an interface newly generated by the connection setting means and another interface when the call connection history does not satisfy the predetermined condition.

The call connection management equipment of the present invention registers generated call connection information in the connection registration part and stores call connection history, such as the connection count. In addition, this call connection management equipment uses the already registered connection information if the call connection history satisfies the predetermined condition, and generates new connection information if the call connection history does not satisfy the predetermined condition. If already registered connection information can be used, call connection is established immediately. Also load on the network decreases, so the processing time required when a new connection is established becomes shorter.

BRIEF DESCRIPTION OF THE DRAWINGS

Other objects and advantages of the present invention will be described with reference to the accompanying drawings.

FIG. 4 is a conceptual diagram depicting a configuration of the connection management table according to the first embodiment;

FIG. 7 is a conceptual diagram depicting a configuration of a history management table according to the second embodiment;

FIG. 8 is a conceptual diagram depicting a configuration of a condition setting table of the second embodiment;

FIG. 10 is a conceptual diagram depicting a configuration of a history management table of the third embodiment;

FIG. 11 is a conceptual diagram depicting a configuration of a condition setting table of the third embodiment;

FIG. 13 is a conceptual diagram depicting a configuration of a history management table of the fourth embodiment;

FIG. 14 is a conceptual diagram depicting a configuration of a condition setting table of the fourth embodiment;

FIG. 16 is a conceptual diagram depicting a configuration of the history management table of the fifth embodiment; and FIG. 17 is a conceptual diagram depicting a configuration of the condition setting table of the fifth embodiment.

DESCRIPTION OF THE PREFERRED EMBODIMENTS

Figure 1:
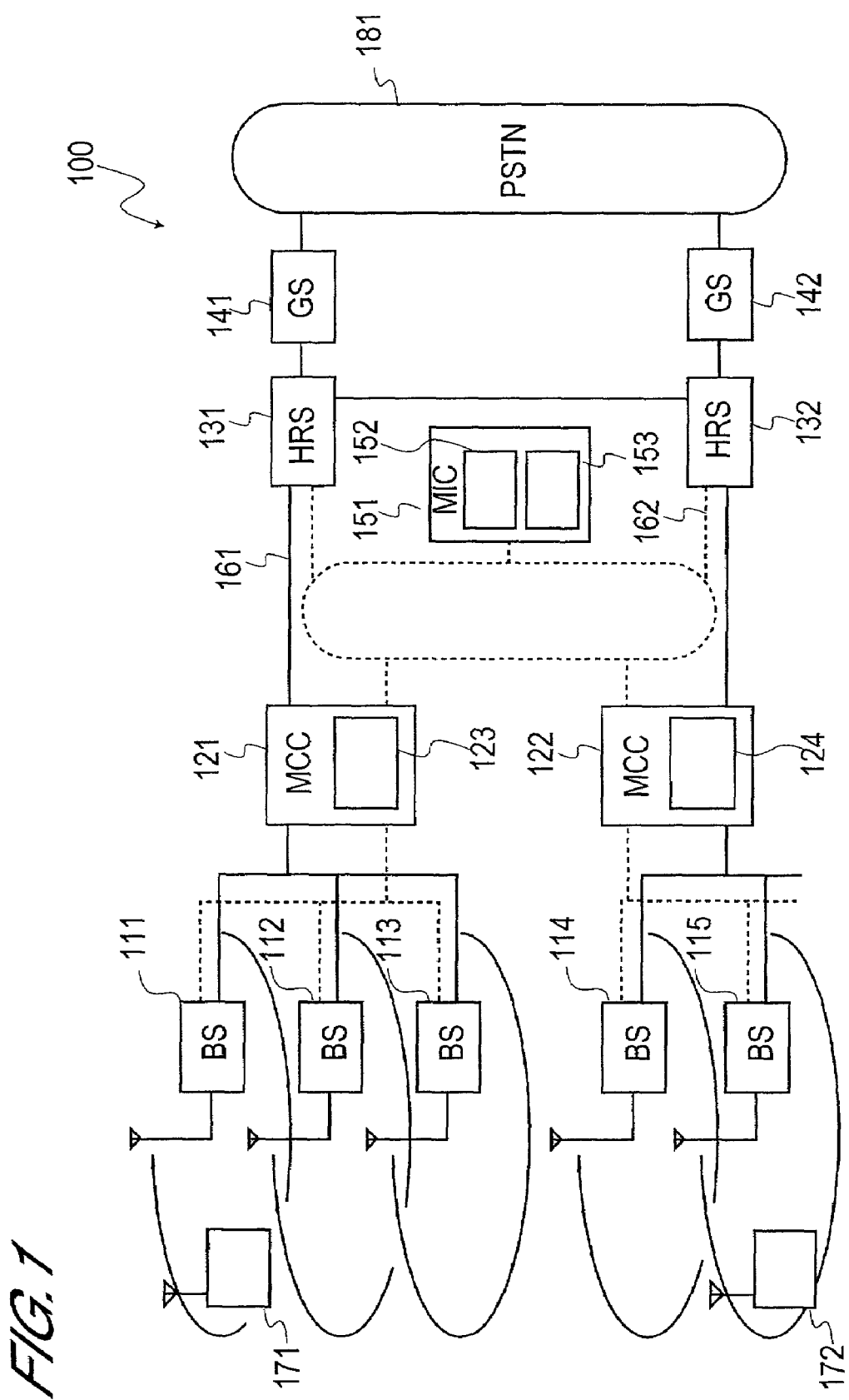
FIG. 1 is a schematic diagram depicting a general configuration of a wireless mobile communication system.

Embodiments of the present invention will now be described with reference to the accompanying drawings. In the drawings, the size, shape and positional relationship of each component are general enough to help understand the present invention, and numerical conditions in the following conditions are merely examples.

First Embodiment

The call connection management equipment according to the first embodiment is used in the wireless mobile communication system. At first, an example of the wireless mobile communication system will be described using FIG. 1. FIG. 1 is an example of a PDC type wireless mobile communication system. The call connection management equipment of the present embodiment, however, can also be used in another system, such as GSM, PHS (Personal Handyphone System), car telephone system, marine telephone system and satellite telephone system.

The wireless mobile communication system 100 in FIG. 1 comprises base stations (BS) 111–115, mobile communication controllers (MCC) 121, 122, higher rank switches (HRS) 131, 132, gateway switches (GS) 141, 142, mobile information center (MIC) 151, an information signal network 161 and a control signal network 162.

The base stations 111–115 accommodate mobile terminals in the zones ZN1–ZN5 which each base station is in charge of. The accommodated mobile terminal and a base station perform wireless communication. In the example in FIG. 1, the base station 111 accommodates the mobile terminal 171, and the base station 115 accommodates the mobile terminal 172.

The mobile communication controller 121 is a switch which accommodates the base stations 111–113. The mobile communication controller 121 has a base station control equipment 123. The base station control equipment 123 controls the base stations 111–113 using information obtained from the mobile communication information center 151. The mobile communication controller 122, on the other hand, is a switch which accommodates the base stations 114 and 115. The mobile communication controller 122 has the base station control equipment 124. The base station control equipment 124 controls the base stations 114 and 115 using information obtained from the mobile communication information center 151.

The higher rank switch 131 accommodates the mobile communication controller 121. The higher rank switch 132, on the other hand, accommodates the mobile communication controller 122. And the higher rank switches 131 and 132 are inter-connected.

The gateway switch 141 is a switch to connect the public switched telephone network (PSTN) 181 and the higher rank switch 131. The gateway switch 142, on the other hand, is a switch to connect the public switched telephone network (PSTN) 181 and the higher rank switch 132. The public switched telephone network 181 accommodates fixed communication terminals, such as subscriber telephones. A call between these fixed communication terminals and mobile terminal 171 is connected via the gateway switches 141 and 142.

The mobile communication information center 151 stores the control information. The mobile communication information center 151 comprises a location register 152 and a service type verification equipment 153. The location register 152 stores the location registration information of each mobile terminal. The location registration information is information to indicate a base station where a mobile terminal is accommodated. The service type verification equipment 153 judges the type of services, which the user can use, for each user according to the request from the base station control equipment 123 and 124 and the higher rank switches 131 and 132. And the service type verification equipment 153 transmits the information for controlling the setting of the network to the base station control equipment 123 and 124 or the higher rank switch 131 or 132 according to the judgment result.

The information signal network 161 is a network for communicating voice signals or communication data. The control signal network 162 is a network for communicating control information. These networks 161 and 162 perform ATM communication. In FIG. 1, the information signal network and the control signal network are established independently, but an information signal and control signal may be communicated on one network.

Figure 2:
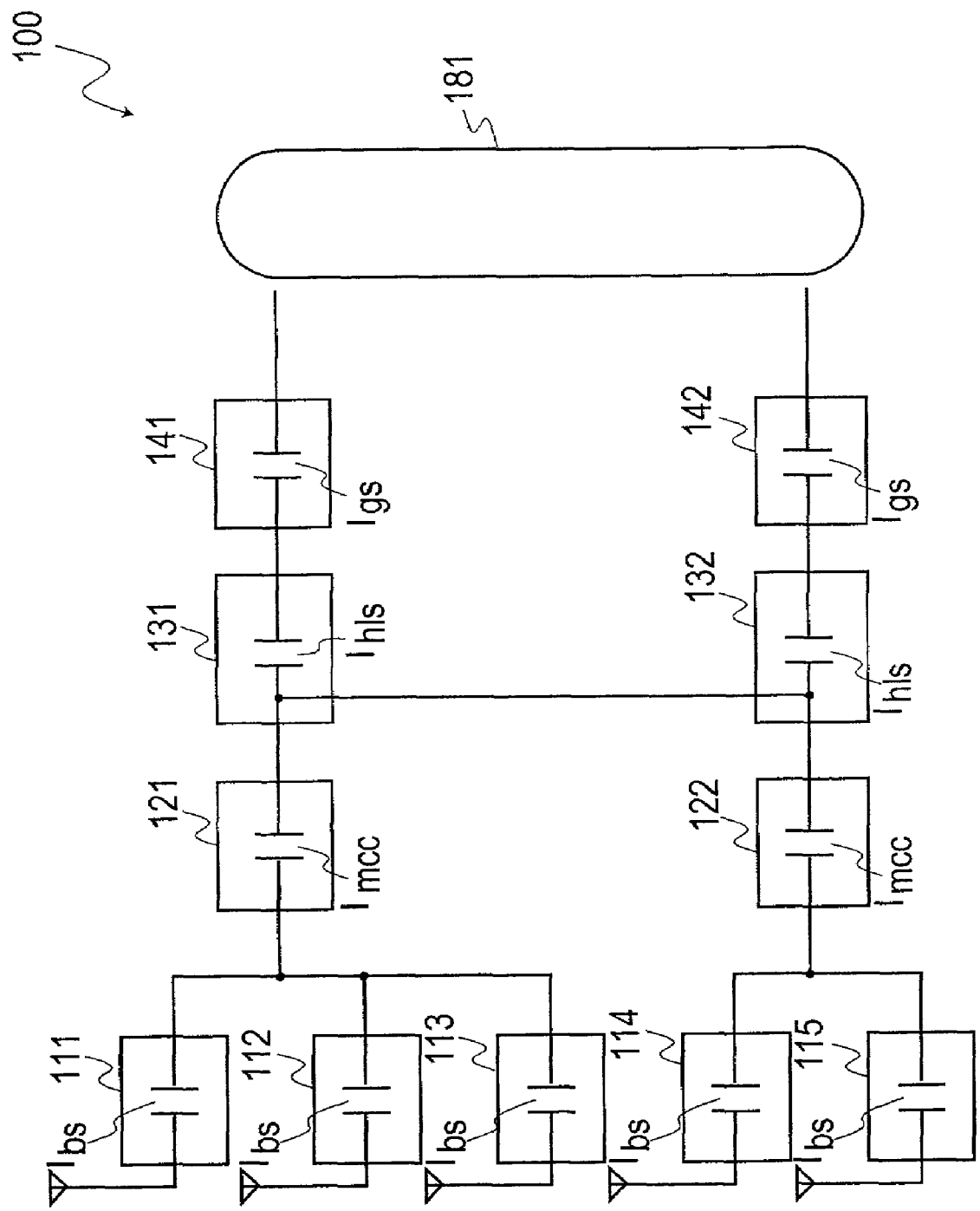
FIG. 2 is a diagram depicting an interface point of the wireless mobile communication system in FIG. 1.

FIG. 2 shows the interface points of the wireless mobile communication system 100 shown in FIG. 1.

The wireless mobile communication system 100 has a hierarchical structure. The base stations 111–115 constitute the lowest layer, the mobile communication controllers 121 and 122 constitute the second layer, the higher rank switches 131 and 132 constitute the third layer, and the gateway switches 141 and 142 constitute the highest layer. The base stations 111–115 have the ATM interface point Ibs respectively, the mobile communication controllers 121 and 122 have the ATM interface point Imcc respectively, the higher rank switches 131 and 132 have the ATM interface point Ihls respectively, and the gateway switches 141 and 142 have the ATM interface point Igs respectively. Wireless interface points exist between the base stations 111–115 and each mobile terminal, which is not illustrated. In addition, an interface point, not illustrated, exists in the public switched telephone network 181.

The call connection management equipment of this embodiment is disposed at one of the ATM interface points Ibs, Imcc, Ihls and Igs, as shown in FIG. 2.

Figure 3:
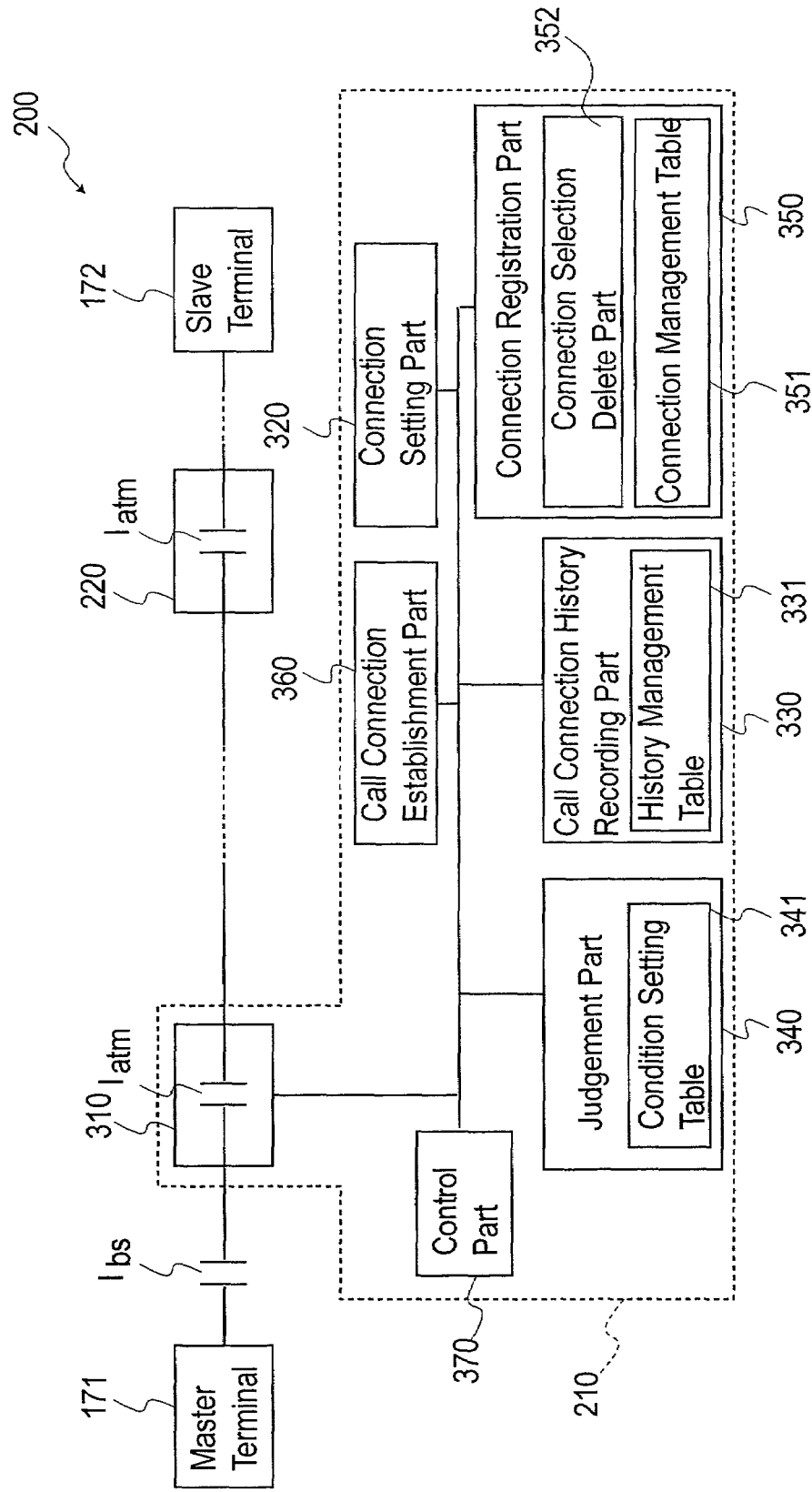
FIG. 3 is a schematic diagram depicting a configuration of the call connection management equipment of the first embodiment.

FIG. 3 shows a schematic diagram depicting a wireless mobile communication system where the call connection management equipment according to the present embodiment is disposed. FIG. 3 shows the case of transmission from a mobile terminal to another mobile terminal.

As FIG. 3 shows, the call connection management equipment 210 of the present embodiment is disposed in the ATM wire communication system. This call connection management equipment 210 comprises an ATM interface part 310, a connection setting part 320, a call connection history recording part 330, a judgment part 340, a connection registration part 350, a call connection establishment part 360 and a control part 370.

The ATM interface part 310 has an ATM interface point Iatm. This ATM interface point Iatm is connected to the mobile terminal 171 via the wireless interface Ibs. In addition, this ATM interface point Iatm is connected to another mobile terminal 172 via another ATM interface part 220 and the wireless interface point Ibs (not illustrated). The interface part 310 specific corresponds to the base station, the mobile communication controller and so on in FIG. 1. When the ATM interface part 310 is a base station, the ATM interface point Iatm and the wireless interface point Ibs can be integrated.

The connection setting part 320 generates connection information for a call connection between the calling terminal (e.g. mobile terminal 171) and called terminal (e.g. mobile terminal 172) when the call connection request is received from the mobile terminal 171. This connection information includes VPI and VCI, the identifiers of terminals 171 and 172 being used in the network, and the IDs of the terminals 171 and 172. For the signaling to establish a call connection, the AAL type 5 of ITU-T recommendation I.365.5 is used. The connection setting part 320 sets VPI/VCI using the received ATM cell when an ATM cell for signaling AAL 5 is received.

The call connection history recording part 330 records connection history. The call connection history recording part 330 has a history management table 331. The call connection history recording part 330 writes the connection history to the history management table 331. The present invention does not restricts the format of the history management table 331. For example, the connection history can be written for each combination of calling terminal ID and called terminal ID. In addition, the present invention does not restricts the type of the connection history. For example, history on the count of call connections, history on the cumulative time of the call connection, history on the service type of the call connection, or history on the distance between terminals of the call connection can be used for the connection history of the present invention. The call connection history recording part 330 writes new history to the history management table 331 each time a new call connection is generated. In addition, the call connection history recording part 330 can delete history written in the history management table 331. When the mobile terminals 171 and 172 communicates using a new route which is different from a previous communication route, history on the combination of mobile terminals 171 and 172 is deleted. For example, when the mobile terminal 171 moves and is connected to another wireless interface, the communication route used for this communication is changed.

The judgment part 340 judges whether the history recorded in the call connection history recording part 330 satisfies a predetermined condition. The judgment part 340 has a condition setting table 341. The judgment part 340 compares the history which is input from the call connection history recording part 330 and the condition which is read from the condition setting table 341 to make a judgment. The predetermined condition is determined by the wireless communication service provider and is written in the condition setting table 341.

The connection registration part 350 registers and manages the connection information generated in the connection setting part 320. The connection registration part 350 registers only the connection information which the judgment part 340 judged that the connection information satisfies the predetermined condition. In other words, the connection information which was judged as not satisfying the predetermined condition is not registered in the connection registration part 350. The connection registration part 350 comprises the connection management table 351 and the connection selection delete part 352. The connection management table 351 stores the connection information. FIG. 4 is a conceptual diagram depicting a configuration example of the connection management table 351. As FIG. 4 shows, the connection management table 351 stores a plurality of types of connection information. Each connection information includes the ID of the calling terminal, the ID of the called terminal, VPI and VCI. In the example of FIG. 4, the two types of IDs are telephone numbers respectively. The connection selection delete part 352 deletes the connection information which is judged to unsatisfy a predetermined condition by the judgement part 340.

The call connection establishment part 360 establishes a call connection based on the connection information. When a call connection request is received, the call connection establishment part 360 judges whether the connection information related to this call connection request is registered in the connection registration part 350. When the corresponding connection information is registered, the call connection establishment part 360 establishes a connection using the connection information. If the corresponding connection information is not registered, the call connection establishment part 360 establishes connection using the connection information set by the connection setting part 320.

The control part 370 performs general control of the call connection management equipment 210.

Figure 5:
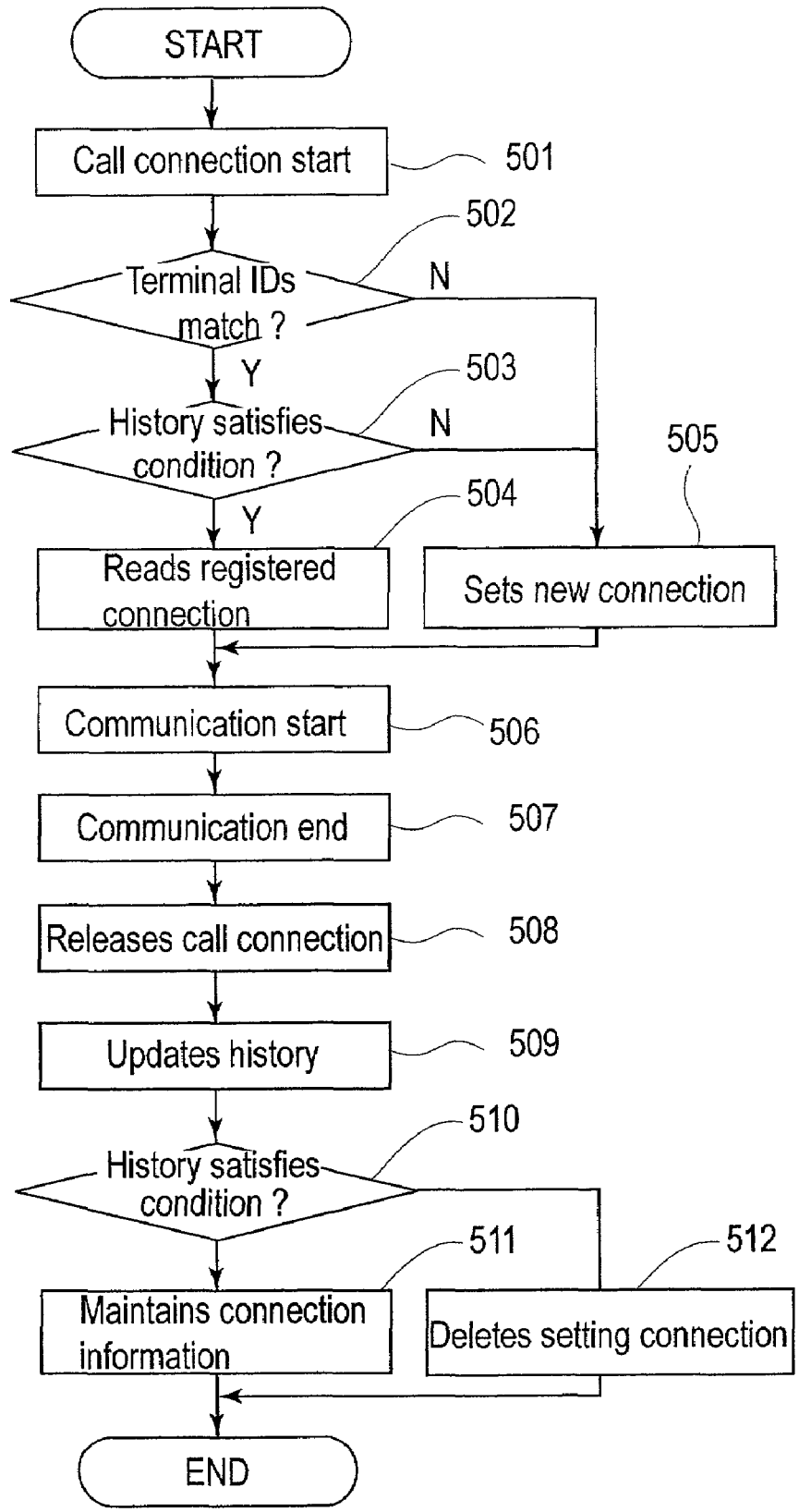
FIG. 5 is a general flow chart depicting operation of the call connection management equipment of the first embodiment.

Now the operation of the call connection management equipment 210 according to the present embodiment will be described with reference to the flow chart in FIG. 5. The following description is the case when the mobile terminal 171 requests a call connection to the mobile terminal 172.

The base station which accommodates the mobile terminal 171 has been registered in advance by the locational registration function of the wireless communication system. Since this locational registration function is the same as the locational registration function of a general wireless communication system, description is omitted.

In Step 501, call connection start processing is executed. The call connection management equipment 210 is not involved in the call connection start processing. Now the call connection start processing will be described with reference to FIG. 1. In the following description, the calling terminal is the mobile terminal 171 and the called terminal is the mobile terminal 172. The mobile terminal 171, which is the calling terminal, transmits a call connection request to the base station controller 123 via the base station 111. This call connection request includes the ID of the mobile terminal 172, which is the called terminal. The base station control equipment 123 transmits this ID to the mobile communication information center 151. The mobile communication information center 151 judges the wireless base station which accommodates the mobile terminal 172 using the location register 152. Then the mobile communication information center 151 notifies the judgment result to the base station control equipment 123. The base station control equipment 123 requests establishing a call connection between the mobile terminal 172 and the mobile communication controller 122 to the base station control equipment 124. When this request is received, the base station control equipment 124 places a general call of the mobile terminal 172 to all the base stations accommodated by the base station control equipment 124, that is, the base stations 114 and 115 in the example in FIG. 1. When the mobile terminal 172 responds to the call, the base station control equipment 123 secures a communication line between the mobile terminal 172 and the mobile communication controller 122. By this, the communication path between the wireless base station 111 and the mobile communication controller 121, the communication path between the mobile communication controller 121 and the high rank switch 131 and the high rank switch 132, the communication path between the high rank switch 132 and the mobile communication controller 122, and the communication path between the mobile communication controller 122 and the wireless base station 115, are all established. The connection between the wireless base stations 111 and 115 may be a connection type or a connectionless type. The connection type is a communication method to start ATM cell transmission after setting VPI/VCI. The connectionless type, on the other hand, is a communication method to start ATM cell transmission before setting VPI/VCI.

In Step 502, the call connection history recording part 330 judges whether the combination of the ID of the calling terminal 171 and the ID of the called terminal 172 has been stored in the history management table 331. The ID of the calling terminal 171 and the ID of the called terminal 172 are included in the call connection request which is received from the calling terminal 171.

When the combination of the IDs is stored in the history management table 331, the corresponding history information is read from the table 331. And the judgment part 340 judges whether the read history satisfies a predetermined condition (Step 504). If the history satisfies the predetermined condition, the corresponding connection information is read from the connection management table 351 and is sent to the call connection establishment part 360 (Step 504).

If the combination of the IDs is not stored in the history management table 331 (see Step 502), the connection setting part 320 generates a new connection information (Step 505). This connection information is stored in the connection management table 351 and is sent to the call connection establishment part 360.

In the same way, when the history does not satisfy the condition (see Step 503) as well, the connection setting part 320 generates a new connection information (Step 505). This connection information is stored in the connection management table 351 and is sent to the call connection establishment part 360.

In Step 506, the call connection establishment part 360 establishes a call connection using the connection information.

When communication ends in Step 507, call connection is released in Step 508.

Then the call connection history recording part 330 updates the history recorded in the history management table 331 (Step 509). For example, when the count of connections is included in the history information, the call connection history recording part 330 overwrites the count. When a new call connection is set in Step 505, the call connection history recording part 330 creates a new history information, and writes this history information to the history management table 331.

Then in Step 510, the judgment part 340 judges history after updating. This judgment is performed only when it is judged that the history does not satisfy the conditions in Step 503.

When the history satisfies the conditions, the connection registration part 340 updates the connection information corresponding to this history (Step 511). In other words, the connection information of the connection management table 351 is overwritten.

If the history does not satisfy the conditions in Step 510, on the other hand, the connection registration part 340 deletes the connection information corresponding to this history (Step 512).

As described above, when the history of a call connection satisfies the predetermined condition, the call connection management equipment 220 according to the first embodiment need not establish a new call connection. Therefore the time from a call request to a call connection establishment decreases. In addition, load on the network decreases, so the required time when a new call establishment is also decreases.

Second Embodiment

The second embodiment is a more specific example of the call connection management equipment according to the first embodiment. In the present embodiment, the call connection management equipment is disposed in the wireless base stations 111–115 (see FIG. 1) respectively. And in the present embodiment, the history of the connection count is used as the call connection history.

Figure 6:
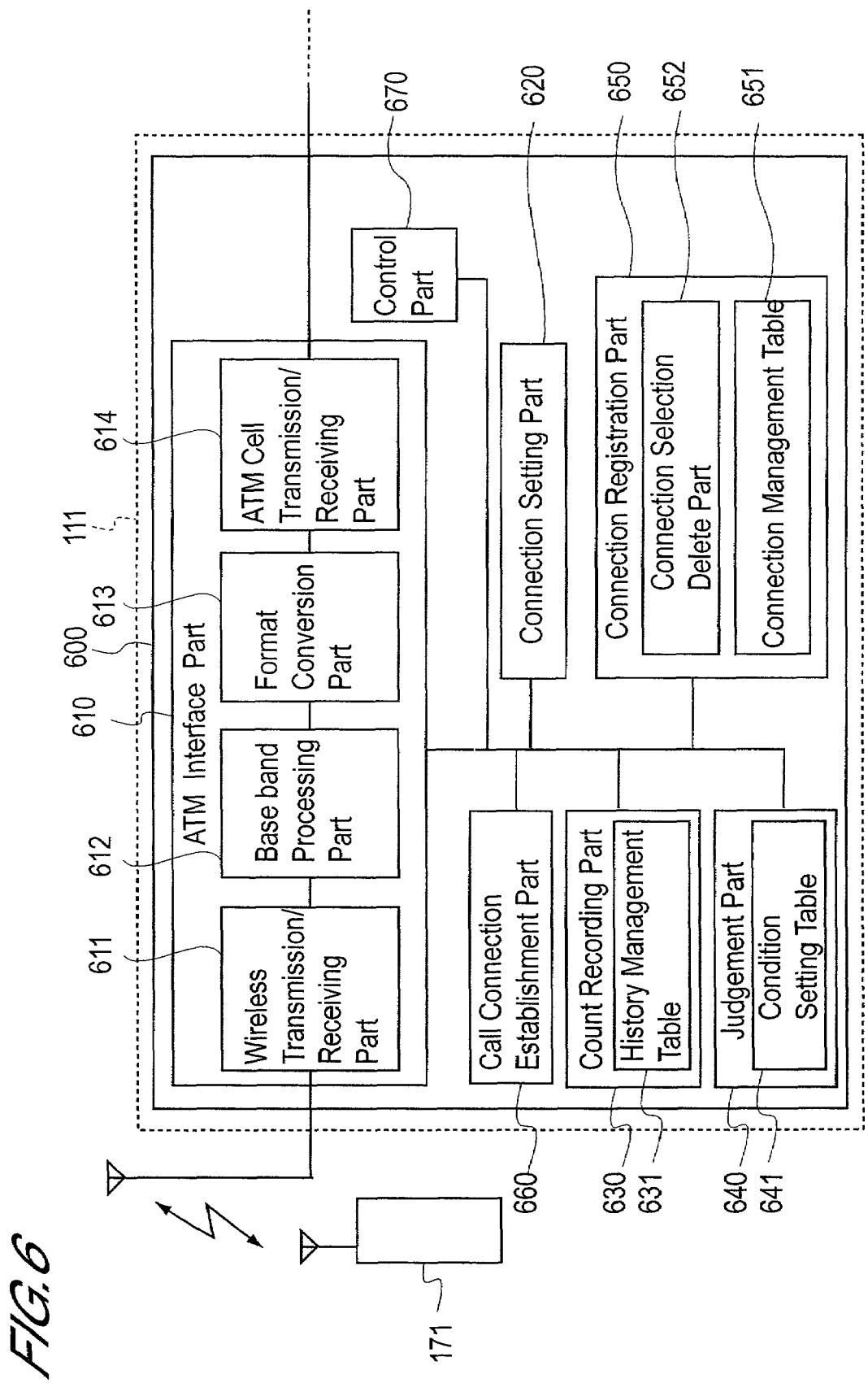
FIG. 6 is a schematic diagram depicting a configuration of the call connection management equipment according to the second embodiment.

FIG. 6 shows the call connection management equipment 600 in the wireless base station 111, and the configuration of the call connection management equipment in the other wireless base stations 112–115 is also the same.

As FIG. 6 shows, this call connection management equipment 600 comprises an ATM interface part 610, a connection setting part 620, a count recording part 630, a judgment part 640, a connection registration part 650, a call connection establishment part 660 and a control part 670.

The ATM interface part 610 converts signals between the wireless communication and the ATM communication. The ATM interface part 610 is comprised of a wireless transmission/receiving part 611, a base band processing part 612, a format conversion part 613 and an ATM cell transmission/receiving part 614.

The wireless transmission/receiving part 611 performs wireless communication with the calling terminal 171 using an antenna.

The base band processing part 612 modulates/demodulates signals. Signals which are input from the format conversion part 613 are modulated and sent to the wireless transmission/receiving part 611. Signals which are input from the wireless transmission/receiving part 611 are demodulated and sent to the format conversion part 613.

The format conversion part 613 converts the format of signals. The format of signals which are input from the base band processing part 612 is converted from the wireless format to the ATM format. The format of the signals which are input from the ATM cell transmission/receiving part 614 is converted from the ATM format to the wireless format.

The ATM cell transmission/receiving part 614 transmits/receives ATM cell to/from the mobile communication controller 121 via the information signal network 161 and the control signal network 162 (see FIG. 1).

The connection setting part 620 generates connection information when the call connection request is received, just like the connection setting part 320 of the first embodiment.

The count recording part 630 stores the count history. The count history is information indicating the count when a call connection is made between each calling terminal and each called terminal. For example, when transmission from the mobile terminal 171 to the mobile terminal 172 is performed three times, the count history is "3". The count recording part 630 has a history management table 631. FIG. 7 is a conceptual diagram depicting the information stored in the table 631. As FIG. 7 shows, the count history is stored in the table 631 for each combination of calling terminal and called terminal. Also the count recording part 630 can delete the history written in the history management table 631. When the mobile terminals 171 and 172 performs communication using a new communication route which is different from a previous communication route, the history on the combination of the mobile terminals 171 and 172 is deleted. For example, when the mobile terminal 171 is accommodated by another wireless base station 112–115, the history on the combination of the mobile terminal 171 and 172 is deleted.

The judgment part 640 judges whether the count history recorded in the count recording part 630 exceeds the threshold value. The judgment part 640 has a condition setting table 641. As FIG. 8 shows, the table 641 stores the count threshold value. The judgment part 640 compares the count history which is input from the count recording part 630 and the count threshold value which is read from the condition setting table 641, to make a judgment. The threshold value is decided by the wireless communication service provider, and is written to the condition setting table 641.

The connection registration part 650 registers and manages the connection information generated in the connection setting part 620, just like the connection registration part 340 of the first embodiment. The connection registration part 650 registers only the connection information when the judgment part 640 judges that the predetermined condition is satisfied.

The call connection establishment part 660 establishes a call connection based on the connection information, just like the call connection establishment part 360 of the first embodiment.

The control part 670 performs general control of the call connection management equipment 600.

Since the general operation of the call connection management equipment 600 is roughly the same as the case of the call connection management equipment 220 according to the first embodiment (see FIG. 5), descriptions thereof are omitted.

As described above, the call connection management equipment 600 according to the second embodiment need not establish a new call connection if the call connection count history is the predetermined value or more. Therefore, the time from a call request to a call connection establishment decreases. In addition, load on the network decreases, so the required time when a new call establishment is also decreases.

Third Embodiment

The third embodiment is a more specific example of the call connection management equipment according to the first embodiment. In the present embodiment, the call connection management equipment is disposed in the wireless base stations 111–115 (see FIG. 1) respectively. In the present embodiment, the cumulative time for the connection is used as the call connection history.

Figure 9:
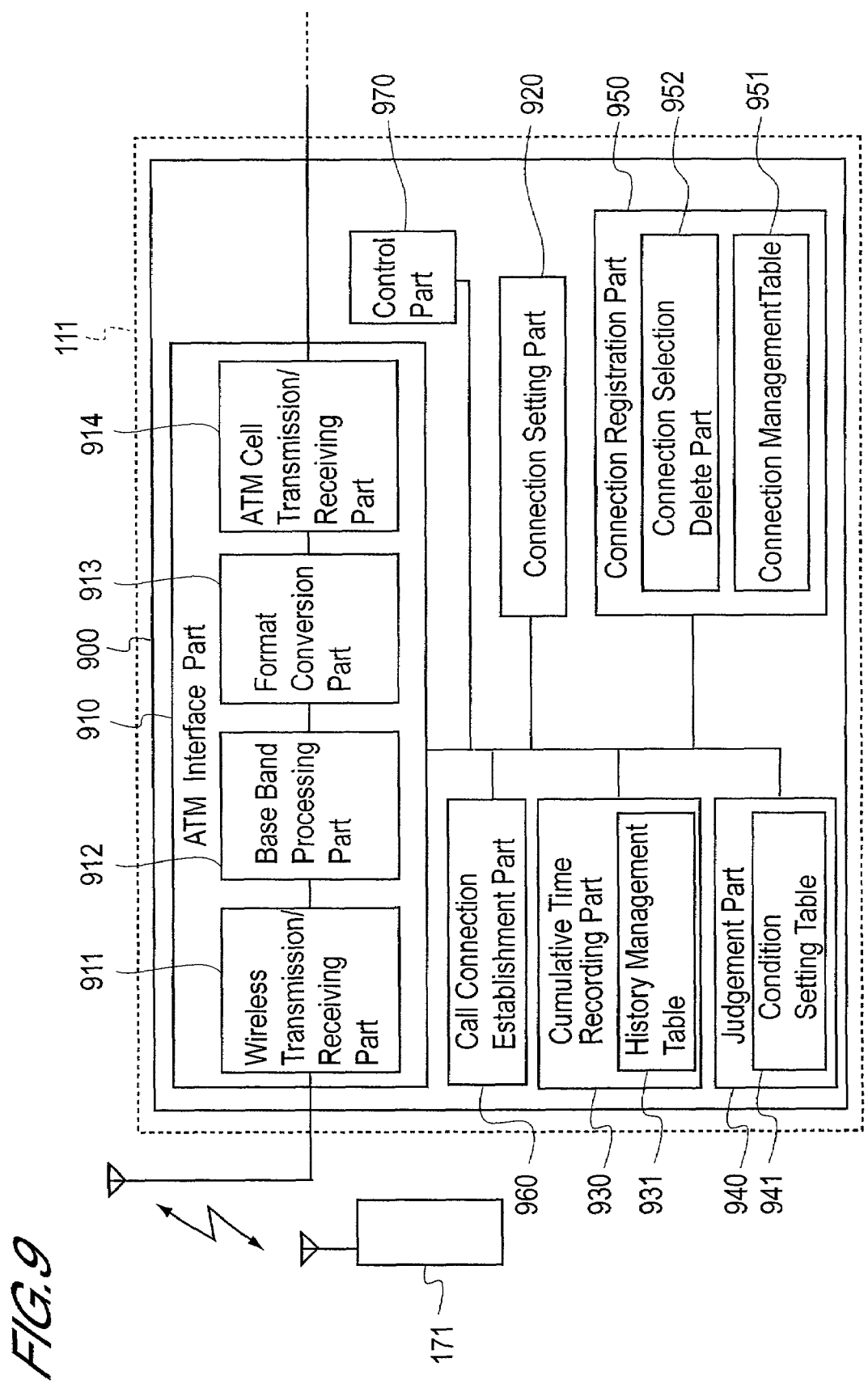
FIG. 9 is a schematic diagram depicting a configuration of the call communication management equipment of the third embodiment.

FIG. 9 shows the call connection management equipment 900 in the wireless base station 111, and the configuration of the call connection management equipment in the other wireless base stations 112–115 is also the same.

As FIG. 9 shows, this call connection management equipment 900 comprises an ATM interface part 910, a connection setting part 920, a cumulative time recording part 930, a judgment part 940, a connection registration part 950, a call connection establishment part 960 and a control part 970.

The ATM interface part 910 converts signals between the wireless communication and the ATM communication. The configuration of the ATM interface part 910 is the same as the interface part 610 of the second embodiment.

The connection setting part 920 generates connection information when a call connection request is received, just like the connection setting part 320 of the first embodiment.

The cumulative time recording part 930 stores the cumulative time of the calls for each combination of a calling terminal and a called terminal. For example, when a call from the mobile terminal 171 to the mobile terminal 172 takes a total of 10 minutes, the count history is "10". The cumulative recording part 930 has a history management table 931. FIG. 10 is a conceptual diagram depicting the recording information in the table 931. As FIG. 10 shows, the cumulative time is stored for each combination of the calling terminal and the called terminal in the table 931. In addition, the cumulative time recording part 930 can delete the cumulative time written in the history management table 931. When the mobile terminals 171 and 172 performs communication using a new route which is different from a previous communication route, the cumulative time of the combination of the mobile terminals 171 and 172 is deleted. For example, when the mobile terminal 171 is accommodated by another wireless base station 112–115, the cumulative time of the combination of the mobile terminal 171 and 172 is deleted.

The judgment part 940 judges whether the cumulative time recorded in the cumulative time recording part 930 exceeds the threshold value. The judgment part 940 has a condition setting table 941. As FIG. 11 shows, the table 941 stores the threshold value of the cumulative time. The judgment part 940 compares the cumulative time which is input from the cumulative time recording part 930 and the threshold value which is read from the condition setting table 941 to make a judgment. The threshold value is decided by the wireless communication service provider and is written to the condition setting table 941.

The connection registration part 950 registers and manages connection information generated in the connection setting part 920, just like the connection registration part 350 of the first embodiment. The connection registration part 950 registers only the connection information when the judgment part 940 judges that a predetermined condition is satisfied.

The call connection establishment part 960 establishes a call connection based on the connection information just like the call connection establishment part 360 of the first embodiment.

The control part 970 performs general control of the call connection management equipment 900.

Since the general operation of the call connection management equipment 900 is roughly the same as the call connection management equipment 210 according to the first embodiment (see FIG. 5), descriptions thereof are omitted.

As described above, the call connection management equipment 900 according to the third embodiment need not establish a new call connection if the cumulative time of the call connection is the predetermined value or more. Therefore the time from a call request to a call connection establishment decreases. In addition, load on the network decreases, so the required time when a new call establishment is also decreases.

Fourth Embodiment

The fourth embodiment is a more specific example of the call connection management equipment according to the first embodiment. In the present embodiment, the call connection management equipment is disposed in the wireless base stations 111–115 (see FIG. 1) respectively. In the present embodiment, a service type is used as the call connection history.

Figure 12:
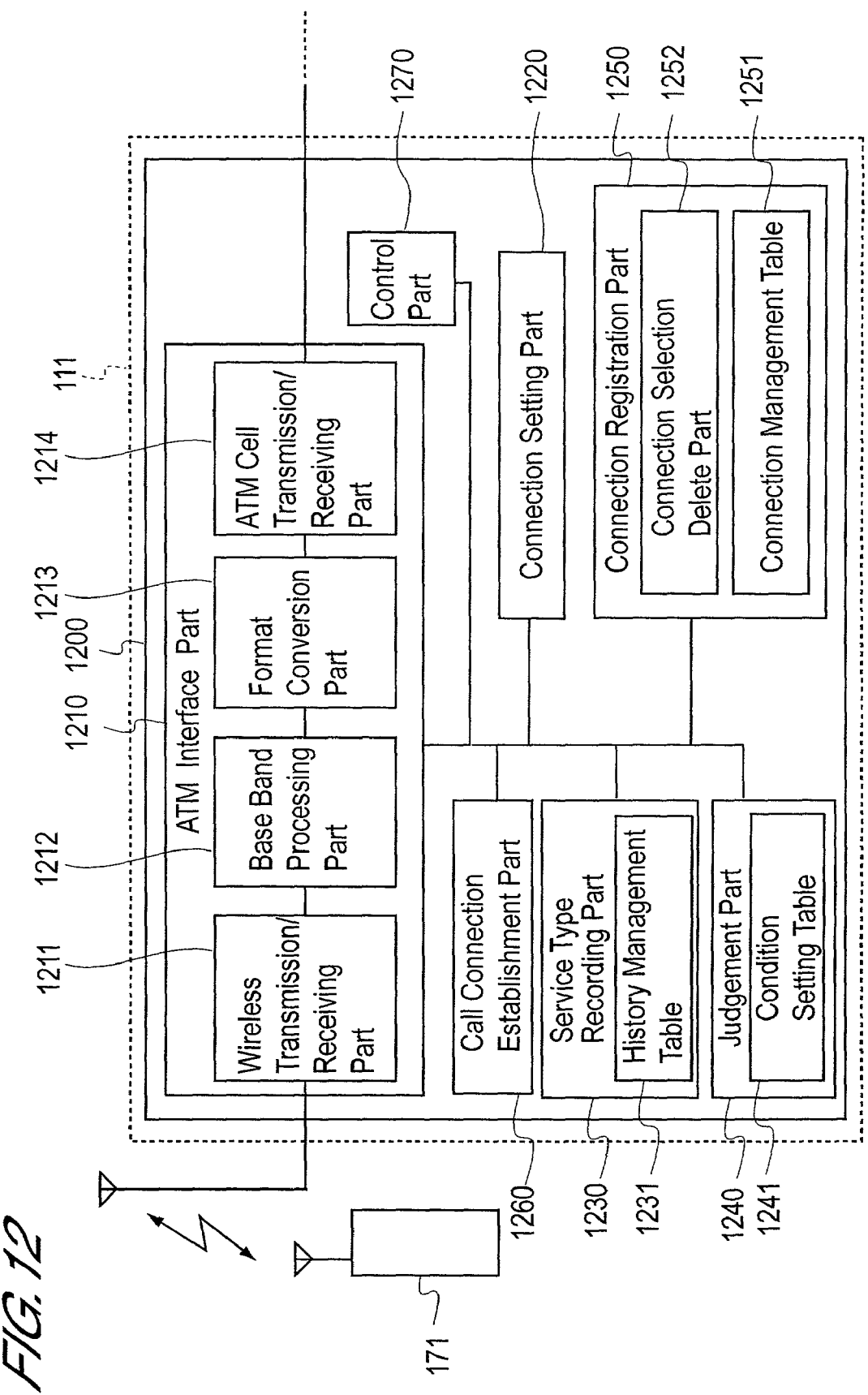
FIG. 12 is a schematic diagram depicting a configuration of a call connection management equipment of the fourth embodiment.

FIG. 12 shows the call connection management equipment 1200 in the wireless base station 111, and the configuration of the call connection management equipment in the other wireless base stations 112–115 is also the same.

As FIG. 12 shows, this call connection management equipment 1200 comprises an ATM interface part 1210, a connection setting part 1220, a service type recording part 1230, a judgment part 1240, a connection registration part 1250, a call connection establishment part 1260 and a control part 1270.

The ATM interface part 1210 converts signals between the wireless communication and the ATM communication. The configuration of the ATM interface part 1210 is the same as the interface part 610 of the second embodiment.

The connection setting part 1220 generates connection information when a call connection request is received, just like the connection setting part 320 of the first embodiment.

The service type recording part 1230 stores the type of service for each combination of a calling terminal and a called terminal. For example, when a 64 kbps communication service is used as the communication service from the mobile terminal 171 to the mobile terminal 172, the service type is "64 kbps". The recording part 1230 has a history management table 1231. FIG. 13 is a conceptual diagram depicting the storage information in the table 1231. As FIG. 13 shows, the service type is stored for each combination of the calling terminal and the called terminal in the table 1231. In addition, the recording part 1230 can delete the service type written in the history management table 1231. When the mobile terminals 171 and 172 performs communication using a new route which is different from a previous communication route, the service type of the combination of the mobile terminal 171 and 172 is deleted. For example, when the mobile terminal 171 is accommodated by another wireless base station 112–115, the service type of the combination of the mobile terminals 171 and 172 is deleted.

The judgment part 1240 judges whether the service type recorded in the recording part 1230 matches with a specified service. The judgment part 1240 has a condition setting table 1241. As FIG. 14 shows, the table 1241 stores the type of the specified service. The judgment part 1240 compares the service type which is input from the recording part 1230 and the service type which is read from the conditions setting table 1241 to make a judgment. The type of the specified service is decided by the wireless communication service provider and is written to the condition setting table 1241.

The connection registration part 1250 registers and manages the connection information generated in the connection setting part 1220, just like the connection registration part 350 of the first embodiment. The connection registration part 1250 registers only the connection information when the judgment part 1240 judges that the predetermined condition is satisfied.

The call connection establishment part 1260 establishes a call connection based on the connection information just like the call connection establishment part 360 of the first embodiment.

The control part 1270 performs general control of the call connection management equipment 1200.

Since the general operation of the call connection management equipment 1200 is roughly the same as the call connection management equipment 210 according to the first embodiment (see FIG. 5), descriptions thereof are omitted.

As the specified service, the bearer service recommended by ITU-U and the service arbitrarily set by the service provider, for example, are used.

The bearer service recommended by ITU-U includes, for example, a circuit switching mode bearer service and a packet switching mode bearer service.

The circuit switching mode bearer service includes, for example, a 64 kbps non-restrictive bearer service, 64 kbps voice bearer service, 64 kbps 3.1 kHz audio bearer service, 64 kbps voice/non-restrictive switching bearer service, 384 kbps, 1536 kbps or 1920 kbps non-restrictive bearer service, 2×64 kbps non-restrictive bearer service, 64 kbps multi-user bearer service, and multi-rate bearer service.

The packet switching mode bearer service includes virtual calling, permanent virtual circuit bearer service, and user signal bearer service.

For these various services, the setting conditions at the network side, such as information transfer speed, symmetry of communication direction and other functions provided in the network are different.

For example, the 64 kbps non-restrictive bearer service is a basic service of the ISDN bearer service, and does not perform A/µ conversion which is essential for voice communication. In the 64 kbps voice bearer service communication, on the other hand, must be performed via an A/µ converter for voice communication and echo control equipment. These functions provided by the network side differ depending on the type of the service.

Services which are arbitrarily set by the service provider include, for example, an Internet connection service. For this type of service, the user must obtain access permission for each service type. Therefore access permission is verified for each service type. Access permissions are managed in batch by the service type verification equipment 153 (see FIG. 1).

As described above, the call connection management equipment 1200 according to the fourth embodiment need not establish a new call connection if the service type of the call connection is a specified service. Therefore, the time from a call request to a call connection establishment decreases. In addition, load on the network decreases, so the required time when a new call establishment is also decreases.

Fifth Embodiment

The fifth embodiment is a more specific example of the call connection management equipment according to the first embodiment. In the present embodiment, the call connection management equipment is disposed in the wireless base stations 111–115 (see FIG. 1) respectively. In the present embodiment, the distance between terminals is used as the call connection history.

Figure 15:
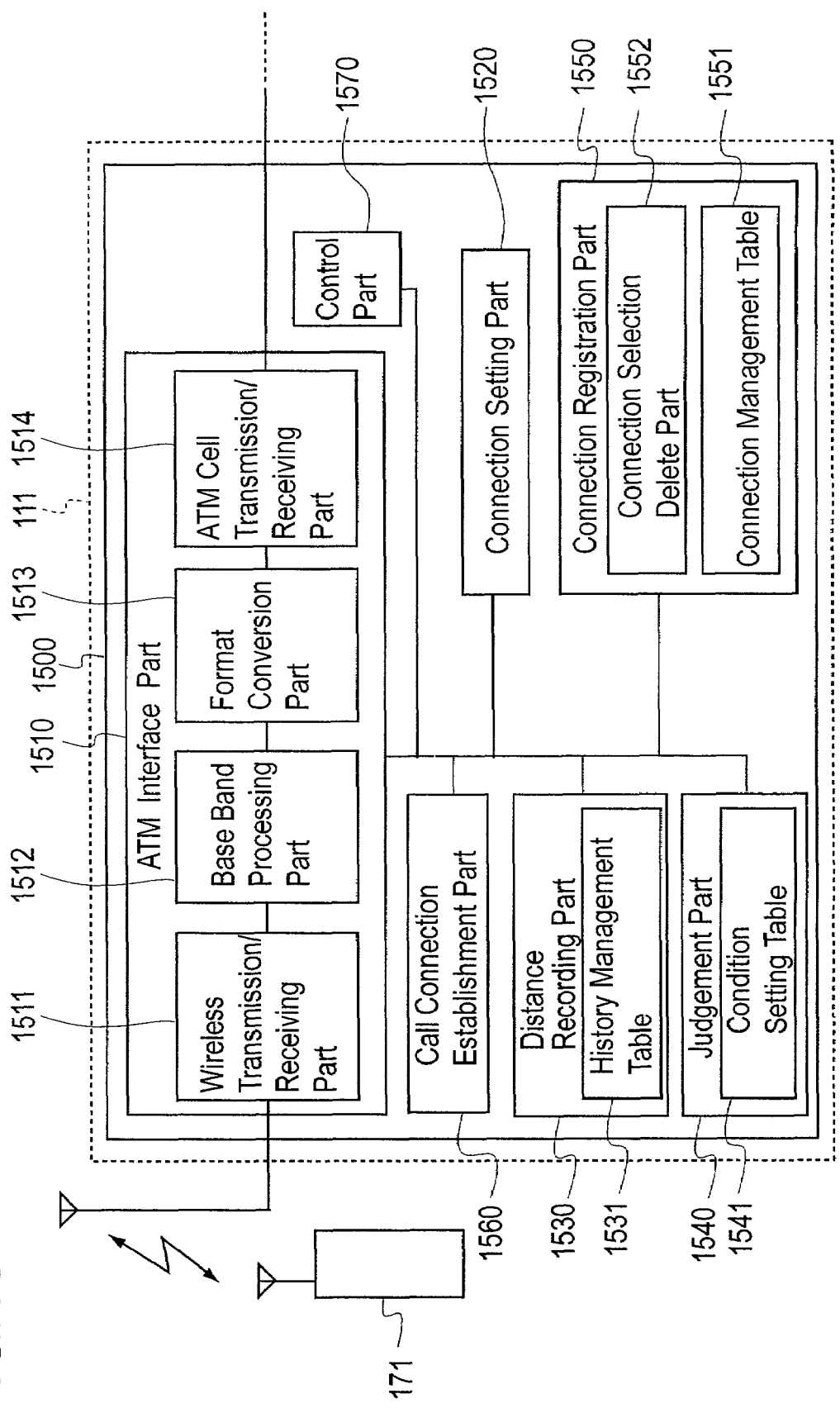
FIG. 15 is a schematic diagram depicting a configuration of the call connection management equipment of the fifth embodiment.

FIG. 15 shows the call connection management equipment 1500 in the wireless base station 111, and the configuration of the call connection management equipment in the other wireless base stations 112–115 is also the same.

As FIG. 15 shows, this call connection management equipment 1500 comprises an ATM interface part 1510, a connection setting part 1520, a distance recording part 1530, a judgment part 1540, a connection registration part 1550, a call connection establishment part 1560, and a control part 1570.

The ATM interface part 1510 converts signals between the wireless communication and the ATM communication. The configuration of the ATM interface part 1510 is the same as the interface part 610 of the second embodiment.

The connection setting part 1520 generates connection information when a call connection request is received, just like the connection setting part 320 of the first embodiment.

The distance recording part 1530 stores the distance between terminals for each combination of a calling terminal and a called terminal. For example, when the distance between the mobile terminal 171 and the mobile terminal 172 is about 300 km, the storage value is "300". The recording part 1530 has a history management table 1531. FIG. 16 is a conceptual diagram depicting the storage information of the table 1531. As FIG. 16 shows, the distance is stored for each combination of the calling terminal and the called terminal in the table 1531. In addition, the recording part 1530 can delete the distance written in the history management table 1531. When the mobile terminals 171 and 172 performs communication using a new route which is different from a previous communication route, the storage value of the combination of the mobile terminals 171 and 172 is deleted. For example, when the mobile terminal 171 is accommodated by another wireless base station 112–115, distance data of the combination of the mobile terminals 171 and 172 is deleted.

The judgment part 1540 judges whether the distance recorded in the recording part 1530 is longer than the threshold value. The judgment part 1540 has a condition setting table 1541. As FIG. 17 shows, the table 1541 stores the threshold value of the distance. The judgment part 1540 compares the distance which is input from the recording part 1530 and the threshold value which is read from the condition setting table 1541 to make a judgment. The threshold value is decided by the wireless communication service provider and is written to the condition setting table 1541.

The connection registration part 1550 registers and manages connection information generated in the connection setting part 1520, just like the connection registration part 350 of the first embodiment. The connection registration part 1550 registers only the connection information when the judgment part 1540 judges that the predetermined condition is satisfied.

The call connection establishment part 1560 establishes a call connection based on the connection information, just like the call connection establishment part 360 of the first embodiment.

The control part 1570 performs general control of the call connection management equipment 1500.

Since the general operation of the call connection management equipment 1500 is roughly the same as the call connection management equipment 210 according to the first embodiment (see FIG. 5), descriptions thereof are omitted.

As described above, the call connection management equipment 1500 according to the fifth embodiment need not establish a new call connection if the distance between terminals is longer than threshold value. Therefore the time from a call request to a call connection establishment decreases. In addition, load on the network decreases, so the required time when a new call establishment is also decreases. Generally speaking, there are more ATM interface points (see FIG. 2) as the distance between terminals becomes longer. So if the distance is long, the time for establishing a new call connection is likely to be long. Therefore if this distance is longer than the threshold value, the processing time can be effectively decreased by using the connection information of the connection registration part 1550.

In the above mentioned respective embodiments, the case when establishing a call connection between the calling terminal 171 accommodated in the wireless base station 111 and the called terminal 172 accommodated in the wireless base station 115 was described as an example. The present invention, however, can be used to establish a call connection between the mobile communication controllers 121 and 122, for example. When the called terminal is accommodated in another communication network, such as PSTN 181 (see FIG. 1), the present invention can be used for establishing a call connection between the wireless base station and the gateway switches 141 and 142 (see FIG. 1), or for establishing a call connection between the mobile communication controller and the gateway switch.

What is claimed is:

1. A call connection management equipment for a communication network having a plurality of interface points which includes a first interface point connected to a calling terminal, a second interface point connected to a called terminal, and other interface points connected between said first interface point and said second interface point, the connection between said first interface point and said calling terminal and/or between said second interface point and said called terminal between wireless connection, and at least one of said plurality of interface points being provided with said call connection management equipment comprising:

a connection setter to generate call connection information concerning calling terminal ID, called terminal ID, and communication route between said first interface point and said second interface point;

a connection register including a connection management table registering said call connection information to said connection management table in a first case that said call connection information has not been recorded in said connection management table, and not registering said call connection information to said connection management table in a second case that said call connection information has been recorded in said connection management table; and a connection establisher to establish a call connection between said calling terminal and said called terminal based on a new connection information generated by said connection setter in said first case , and to establish a call connection between said calling terminal and said called terminal based on said connection information registered in said connection management table in said second case.

2. The call connection management equipment according to claim 1, wherein said first interface is a wireless base station.

3. The call connection management equipment according to claim 2, wherein said second interface point is a gateway switch for connecting said wireless communication network and another communication network.

4. The call connection management equipment to claim 2, wherein said second interface point is a mobile communication controller.

5. The call connection management equipment according to claim 2, wherein said second interface point is a gateway switch for connecting said wireless communication network and another communication network.

6. The call connection management equipment according to claim 1, wherein said second interface point is a wireless base station.

7. The call connection management equipment according to claim 1, wherein said first interface point is a mobile communication controller.

8. The call connection management equipment according to claim 1, wherein said first interface point and said second interface point are ATM interfaces.

9. The call connection management equipment according to claim 1, wherein said connection register is adapted to delete the registration of said call connection information corresponding to said calling terminal from said connection management table when said first interface point to accommodate the calling terminal is switched.

10. The call connection management equipment according to claim 9, wherein said connection register is adapted to delete the registration of said call connection information corresponding to said calling terminal from said connection management table when a wireless base station to accommodate the calling terminal is switched.

11. The call connection management equipment according to claim 9, wherein said connection register is adapted to delete the registration of said call connection information corresponding to said calling terminal from said connection management table when a mobile communication controller corresponding to the calling terminal is switched.

12. The call connection management equipment according to claim 1, wherein said connection register is adapted to delete the registration of said call connection information corresponding to said called terminal from said connection management table when said second interface point to accommodate the called terminal is switched.

13. The call connection management equipment according to claim 12, wherein said connection register is adapted to delete the registration of said call connection information corresponding to said called terminal from said connection management table when a wireless base station to accommodate the called terminal is switched.

14. The call connection management equipment according to claim 12, wherein said connection register is adapted to delete the registration of said call connection information corresponding to said called terminal from said connection management table when a mobile communication controller corresponding to the called terminal is switched.

* * * * *